March 5, 1935. R. O. BERG ET AL 1,993,397
EXHAUST CONDUIT AND MUFFLER FOR AN AUTOMOTIVE VEHICLE
Filed Oct. 10, 1930 7 Sheets-Sheet 1

INVENTORS
RICHARD O. BERG
SIMON BERG
BY
ATTORNEYS.

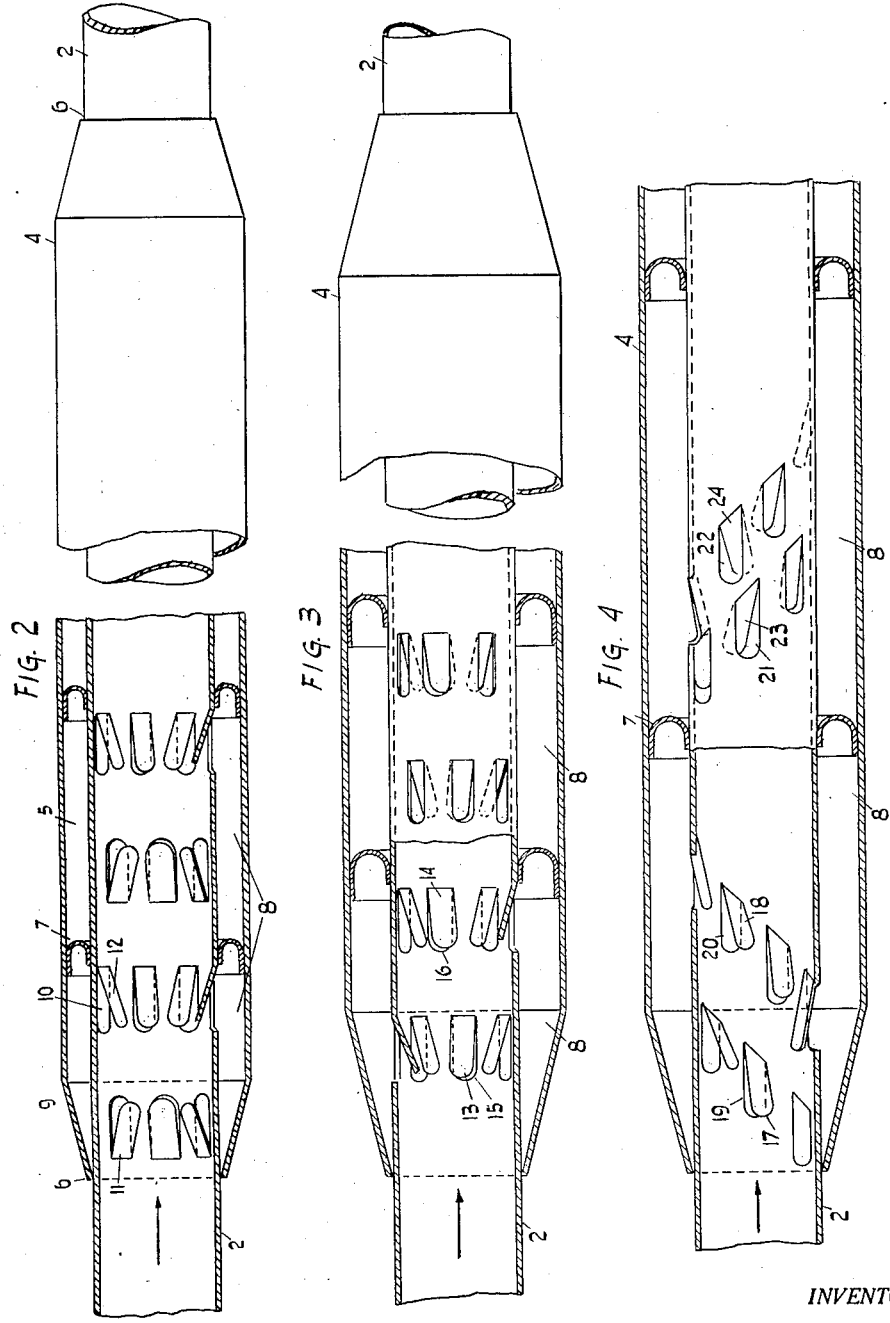

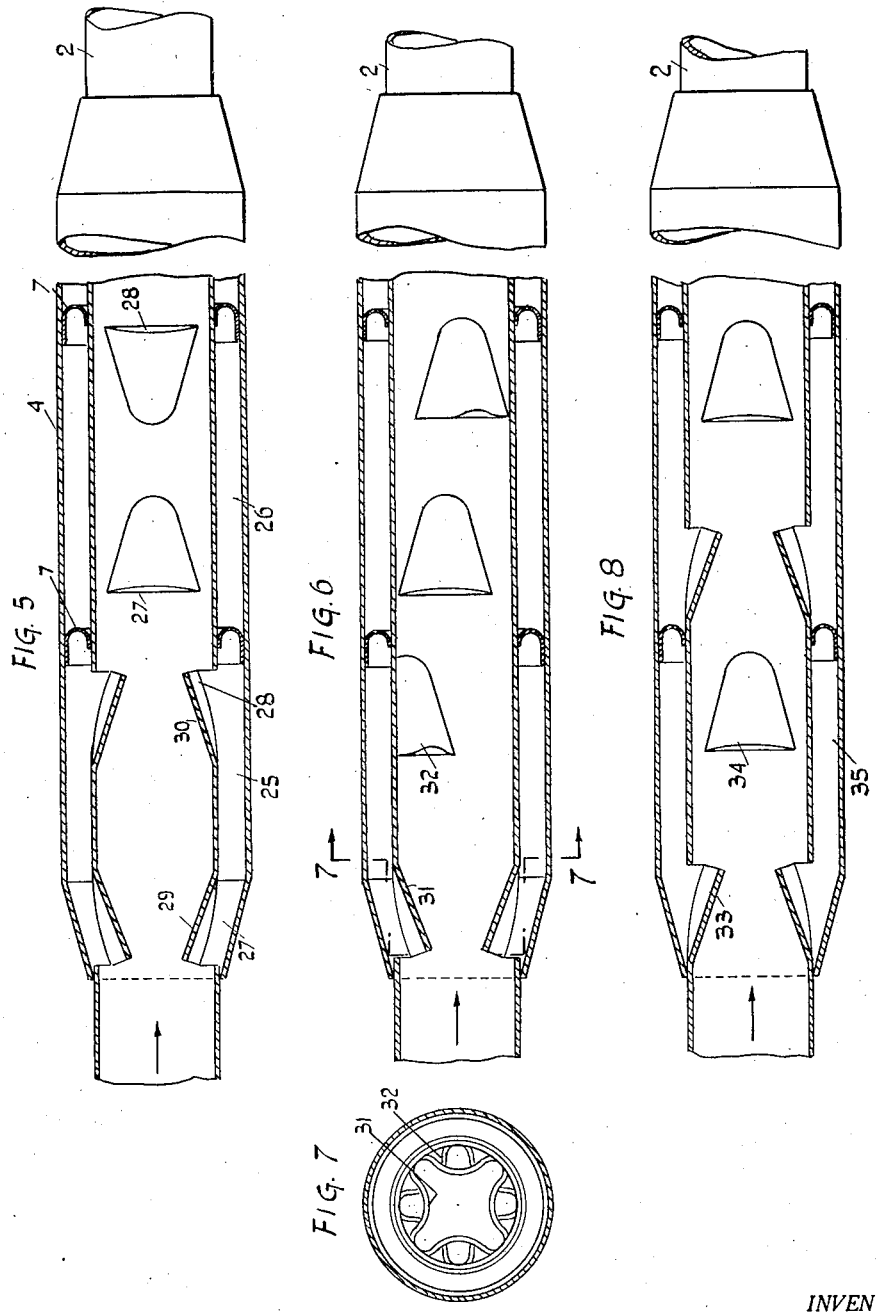

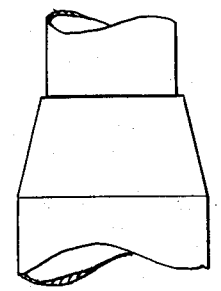
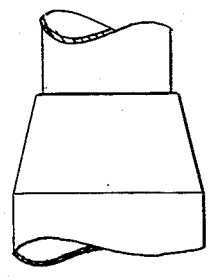
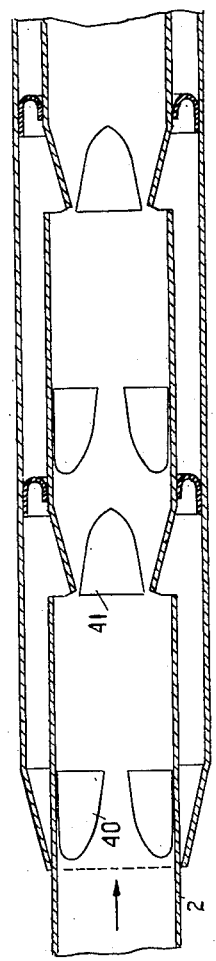
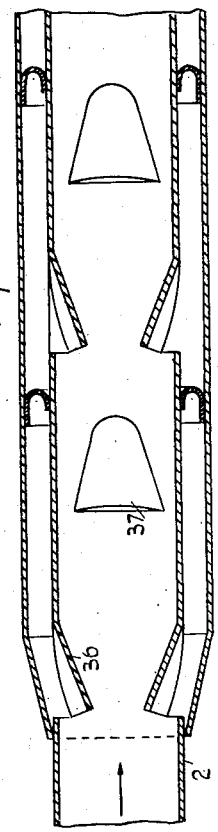
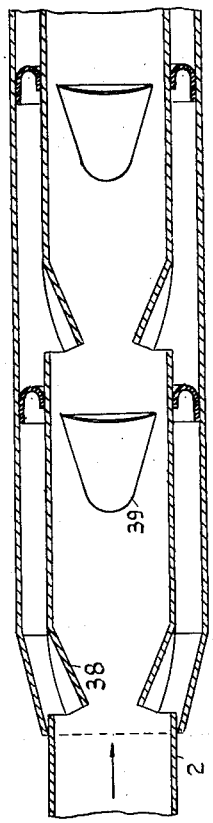
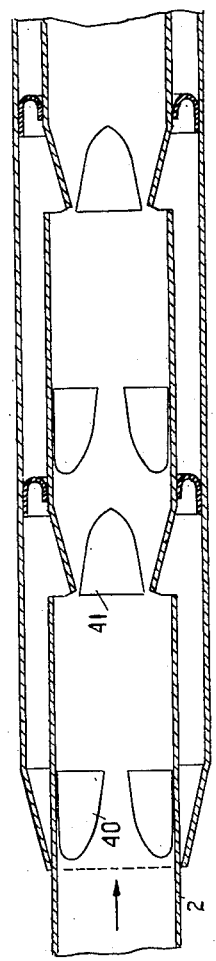

March 5, 1935. R. O. BERG ET AL 1,993,397
EXHAUST CONDUIT AND MUFFLER FOR AN AUTOMOTIVE VEHICLE
Filed Oct. 10, 1930 7 Sheets-Sheet 5
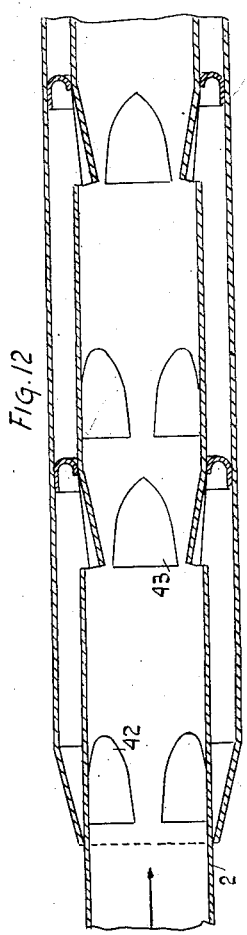
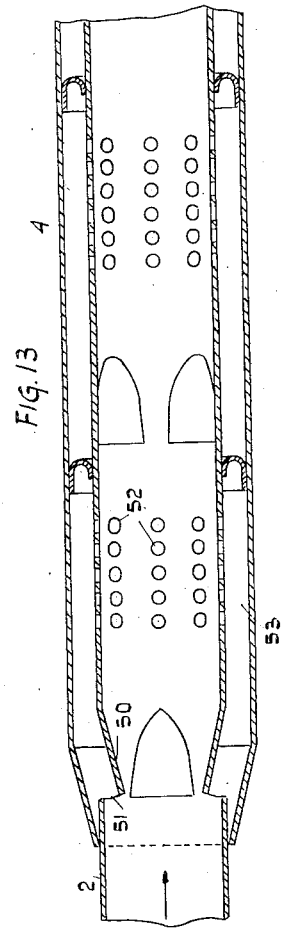
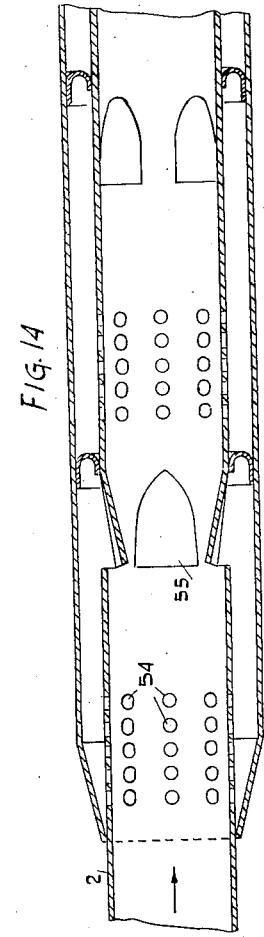
INVENTORS
RICHARD O. BERG
SIMON BERG
BY
*Barnes & Kisselle*
ATTORNEYS.

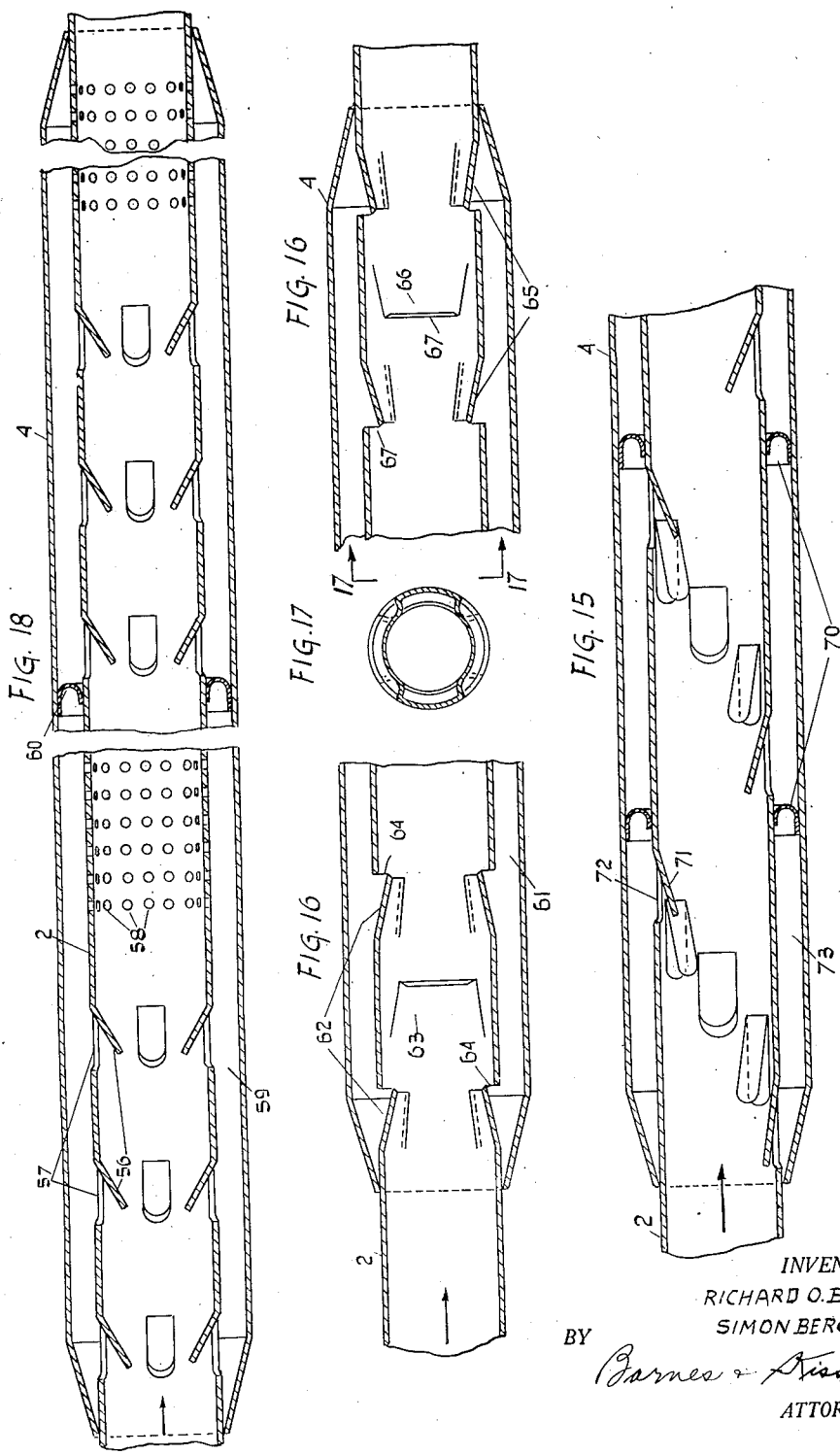

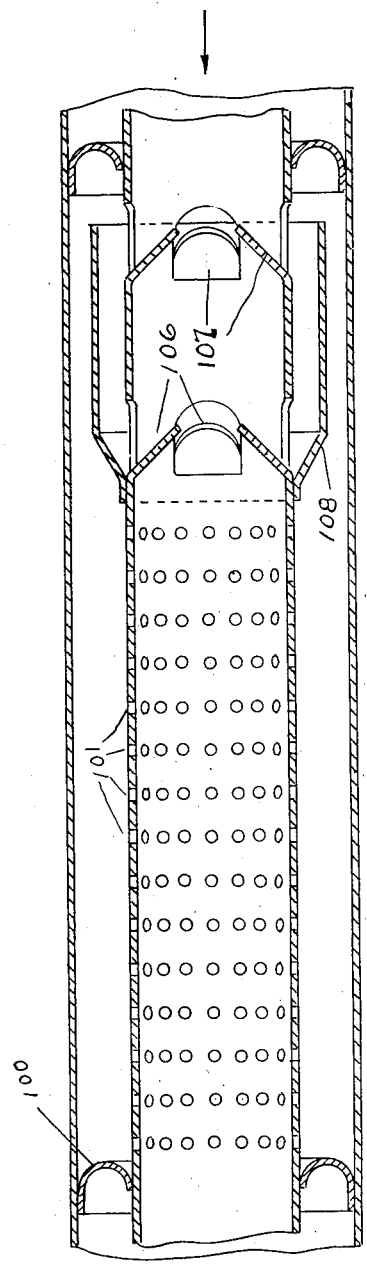
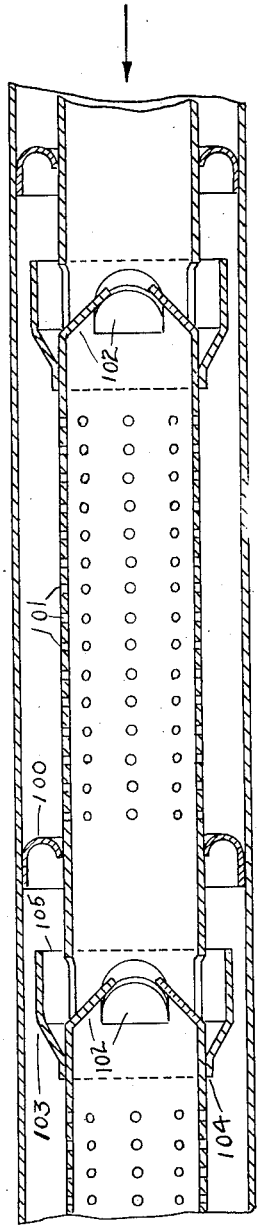

Patented Mar. 5, 1935

1,993,397

UNITED STATES PATENT OFFICE 1,993,397

EXHAUST CONDUIT AND MUFFLER FOR AN AUTOMOTIVE VEHICLE

Richard O. Berg and Simon Berg, Detroit, Mich., assignors to Michigan Steel Tube Products Company, Detroit, Mich., a corporation of Michigan Application October 10, 1930, Serial No. 487,820

3 Claims. (Cl. 137—160)

This invention relates to an exhaust conduit and muffler for an automotive vehicle.

It is common practice in the automotive field to construct the exhaust conduit of three separate parts. These parts are as follows: The portion between the exhaust manifold and the muffler which is commonly called the exhaust pipe; the portion including the muffler; and lastly, the portion which extends from the muffler rearwardly which is known as the tail piece. The exhaust pipe, the muffler, and the tail piece are joined together by various well-known coupling devices.

It is an object of this invention to produce an exhaust conduit and muffler which is cheaper to manufacture than the exhaust conduit and muffler assembly above described and which eliminates the joints of the above described conduit and muffler assembly which are often poorly constructed and, owing to the expansion and contraction of the metal, often permit leakage of the exhaust gases. These objects are attained by fabricating the exhaust pipe, muffler portion, and tail pipe in one integral piece which is preferably a seamless tube and enclosing a portion of this integral tube within a casing and then forming the tube within the casing to effect a muffling combination between the tube and the casing.

In the drawings:

Fig. 2 is a fragmentary view partly in section showing a portion of the exhaust conduit and the surrounding muffler casing.

Fig. 3 is a view similar to Fig. 2 showing the portion of the exhaust pipe within the surrounding casing formed in alternative manner from that shown in Fig. 2.

Fig. 4 is a view similar to Fig. 2 showing a further modification of the formed exhaust pipe.

Fig. 5 is a view similar to Fig. 2 showing another form of the formed exhaust pipe.

Fig. 6 is a view similar to Fig. 2 showing another modification of the formed exhaust pipe.

Fig. 7 is a section along the line 7—7 of Fig. 6.

Fig. 8 is a view similar to Fig. 2 showing another form of the formed exhaust conduit.

Fig. 9 is a view similar to Fig. 2 showing a further modification of the formed exhaust pipe.

Figure 1:
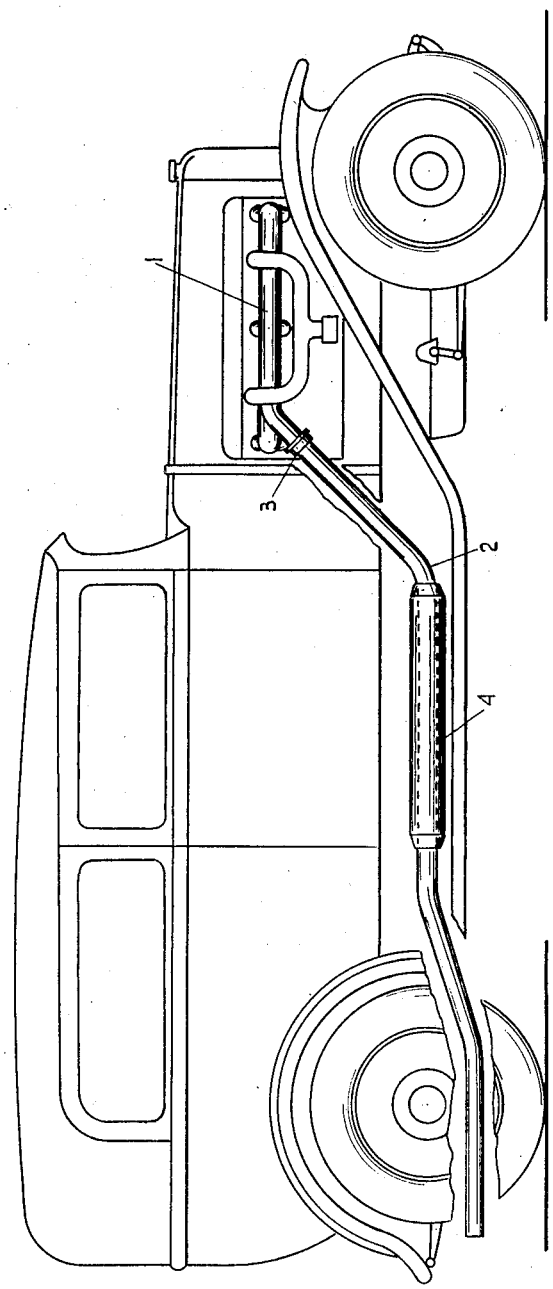
Fig. 1 is a side elevation of an automotive vehicle which has been partly broken away to show the integral exhaust conduit and muffler combination assembled to the vehicle.

Figs. 10, 11, 12, 13, 14, 15, and 16 are views similar to Fig. 2 showing further modifications of the formed exhaust pipe.

Fig. 17 is a section along the line 17—17 of Fig. 16.

Fig. 18 is a view similar to Fig. 2 showing a further modification of the formed exhaust pipe.

Figs. 19 and 20 show additional modifications of the applicants' invention.

Referring more particularly to the drawings, especially to Fig. 1, there is shown a conventional automobile having an internal combustion engine which is provided with an exhaust manifold 1. The exhaust gases from the internal combustion engine are conducted from the exhaust manifold 1 to the rear of the vehicle, and there exhausted into the atmosphere by a single integral conduit referenced 2. This conduit is connected to the exhaust manifold as at 3 by a suitable coupling member which effects a gas-tight seal between the exhaust conduit 2 and the manifold 1. This exhaust conduit 2 is preferably in the form of a continuous seamless tube such as may be formed by passing a continuous web of sheet metal through suitable forming dies which form this web into a tube and then welding the longitudinal joint to form a continuous seamless tube.

It is proposed to muffle the explosion noises of the engine by forming the exhaust conduit 2. A portion of the exhaust conduit 2 is first enclosed within a casing 4. The casing 4 is of greater diameter than the conduit 2, and hence, cooperates with the conduit 2 to form therebetween the chamber 5. The casing 4 is joined to the conduit 2 at each end as at 6 with a gas-tight seal which may be effected in any suitable manner such as by welding the casing to the conduit. The chamber 5 between the conduit 2 and the casing 4 may be divided into a plurality of separate chambers by any suitable means such as the circular baffles 7. The baffles 7 are ring-like members each having a central opening through which the conduit 2 projects and contact with the casing 4 along their outer peripheral surfaces. The portion of the conduit 2 within the casing may then be variously formed as by stamping or pressing suitable openings and cooperating troughs into the portion of the conduit enclosed within the casing 4. Since it is proposed to form the integral tube in various forms, it is thought best to describe the various forms one by one as shown in the several figures of the drawings.

In Fig. 2 the space between the outside of the exhaust conduit 2 and the inside of the casing 4 is divided into a plurality of separate chambers which may be referenced 8 by the baffles 7. Each chamber 8 communicates with the interior of the conduit 2 through the openings 9 and 10. The openings 9 and 10 are formed by striking in the tongues 11 and 12 respectively in the conduit 2. These tongues are opposed to each other. Hence, as the exhaust gases pass from the left to the right through the conduit 2 as indicated by the arrow they first strike the tongues 11 which in a measure break up the sound waves. The gases then meet the inwardly struck tongues 12 which direct a portion of the gases through the openings 10 into the first chamber 8 where the gases expand to likewise break up still more of the sound waves caused by the explosion in the cylinders. In the chambers 8 the gases are also cooled since the outer casing 4 is in contact with the outside atmosphere and made of sheet metal. This cooling likewise serves to break up some of the sound waves. The gases escape from the chamber 8 through both the openings 9 and 10 but mostly through the openings 9. Hence, the gases in the chamber 8 also serve to cushion each pulsation of gas as it seeks to enter the chambers 8 through the openings 10. Some of the gas, of course, passes directly through the tube past the baffles 11 and 12 without entering the chambers 8. As the gas passes into the second chamber 8 it repeats the action that it has gone through in chamber 1 and thus still more of the sound waves are broken up. This action repeats itself throughout the several chambers 8 in the casing 4 until the gas is finally discharged into the atmosphere through the openings in the rear end of the conduit 2.

This type of muffler serves to completely muffle the explosion noises with relatively little back pressure. It will be noted that the junction of the tongues 11 with the conduit 2 is along a broken circular line concentric with the axis of the conduit 2 and in a plane normal to the axis of the conduit 2. The same is true of the tongues 12. Tongues 11 and 12 are in staggered relation.

In Fig. 3 there is shown an arrangement similar to that shown in Fig. 2 in that the tube 2 has struck therein the tongues 13 and 14 to form the openings 15 and 16, the only difference being that the tongues 13 and 14 are not opposed but are struck inwardly in the same direction. It will also be noted that the tongues 13 are staggered in relation to the tongues 14. In this form some of the exhaust gases will be directed by the tongues 13 into the initial chamber 8 where they will expand and also collide with some of the gases that have been directed into the chamber 8 by the struck-in tongues 14, thus a portion of the gas will serve to cushion another portion of the gas and thus tend to break up the sound waves. It will be noted that the tongues of the portion of the tube within the second chamber 8 are struck outwardly of the conduit 2 rather than inwardly like the tongues 13 and 14.

In Fig. 4 the tongues 17 and 18 are struck in the tube 2 in the same direction to form the staggered openings 19 and 20. In this arrangement the tongues 17, and the same holds true of tongues 18, are struck in such that if a line be drawn connecting the junctions of each tongue 17 with the tube 2 this line will be helical. In this instance we get an action on the part of the gases similar to that of the form shown in Fig. 3 but additionally, owing to the spiral arrangement of the tongues 17 and 18, the gases are given somewhat of a spiral turning movement which additionally serves to destroy the sound waves. After the gas has passed through the portion of the tube 2 within the first chamber 8 into the portion of the tube within the second chamber 8 it is again permitted to expand into the second chamber 8 through the openings 21 and 22. In this instance the openings 21 and 22 are positioned helically and in the same direction to the tongues 17 and 18. Further, the tongues 23 and 24 are struck inwardly of the conduit 2 to form the openings 21 and 22 respectively. This arrangement of the first two chambers 8 with the tongues of the first chamber struck inwardly and the tongues of the second chamber struck inwardly and the same helical arrangement of the openings and tongue, is repeated throughout the succeeding chambers of the muffler.

In the form shown in Fig. 5 the space between the casing 4 and the tube 2 is divided into a plurality of chambers such as those shown in 25 and 26 by the baffles 7. The inside of the tube 2 communicates with the chambers 25 and 26 through the openings 27 and 28. The openings 27 and 28 are aligned. These openings are formed by making a plurality of circumferential slits in the tube and then pressing a portion of the tube adjacent the slits inwardly to form the troughs 29 and 30 which are opposed to each other. The trough 29 deflects some of the exhaust gases outwardly into the first chamber 25 where they expand and also are cooled somewhat by contact with the outer casing 4. The gases are free to pass from the chamber 25 through the opening 28 into the tube 2 whereupon the same form is repeated upon entering the portion of the tube 2 within the second chamber 26.

The form shown in Fig. 6 has the struck-in troughs 31 and 32 which are in staggered relation but which are struck inwardly in the same direction rather than in the opposed direction as shown in Fig. 5. The staggered relation of the troughs 31 and 32 is also brought out nicely in Fig. 7.

In the form shown in Fig. 8 the struck-in troughs 33 and 34 are in staggered relation and also opposed to each other but in the reverse direction of those shown in Fig. 5; that is, the opening in the tube is at the right end of the troughs 33 whereas it is at the left end of the troughs 34. Hence, a certain portion of the gases is deflected upwardly by the tongue 34 into the chamber 35 where it expands and again enters the tube 2 into the openings formed by the trough 33.

The form shown in Fig. 9 is similar to that shown in Fig. 6, the difference being that the longitudinal axis of the trough 36 runs parallel of the axis of the tube 2 but offset 90° from the axis of the trough 37 whereas the axes of the troughs 31 and 32 (Fig. 6) are offset 45°.

The form shown in Fig. 10 is similar to that shown in Fig. 5, the difference being that the longitudinal axis of the trough 38 is offset 90° from the longitudinal axis of trough 39 rather than in alignment as is the case of the axes of the troughs 29 and 30 (Fig. 5).

The form shown in Fig. 11 is similar to that shown in Fig. 8, the difference being that the axes of the troughs 40 and 41 are offset 45° rather than 90° as in the troughs 33 and 34 in Fig. 8.

The form shown in Fig. 12 is similar to that shown in Fig. 9, the difference being that the axes of the troughs 42 are offset 45° from the axes of the troughs 43 rather than 90° as is the case of the axes of troughs 36 and 37 in the form shown in Fig. 9.

The form shown in Fig. 13 has a plurality of troughs 50 forming the openings 51 spaced 90° from each other in combination with a plurality of openings 52. The troughs 50 are struck in the same as the troughs 29 of the form shown in Fig. 5. The aggregate area of the openings 52 is preferably substantially equal to the cross sectional area of the conduit 2. In this case some of the gases are deflected outwardly by the troughs 50 into the chamber 53 where they are expanded and cooled, thus destroying some of the sound waves. The gases pass from the chamber 53 into the tube 2 through the openings 52, conflict with, and are cushioned by, the exhaust gases which pass by the troughs 50, and continue through the tube 2. This same action is repeated as the gases enter the portion of the tube 2 beyond the first baffle.

The form shown in Fig. 14 is similar to that shown in Fig. 13 except that in this instance the holes 54 are positioned ahead of the struck-in troughs 55.

In the form shown in Fig. 15 the space between the tube 2 and the casing 4 is divided into a plurality of chambers by the baffles 70. The portion of the tube between the baffle 70 and the ends of the casing 4 have struck therein the tongues 71 to form the openings 72. The openings 72 are arranged in a helical path about the tube 2. In this instance some of the gases pass directly through the tube 2 without entering the chambers surrounding the tube. Some of the gases are deflected outwardly by the spirally arranged tongues 71 and give somewhat of an initial turning movement. Since the gas which enters the outer chambers 73 must again re-enter the tube 2 through the openings 72 through which it entered the chamber 73, there is a conflict of the gases which cushion each other and destroy the sound waves. The action in each of the chambers is the same.

In Figs. 16 and 17 there is shown another form of the muffler portion of the exhaust conduit in which the space between the conduit 2 and the casing 4 is a single chamber 61. This differs from the outer forms in that this space 61 is not divided into a plurality of separate chambers by the circular baffles. In this form the tube 2 has pressed therein the aligned troughs 62 which are offset 45° from the struck-in troughs 63. In this instance the openings 64 are at the right end of the troughs 62 and 63. At the opposite end of the casing 4 the tube 2 has struck therein in opposed relation to the tongues 62 and 63 the aligned troughs 65 and the troughs 66 offset 90° from the troughs 65. In this case the openings 67 are at the left ends of the troughs 65 and 66. Hence, the gases pass through tube 2 from left to right where they are deflected outwardly by the tongues 65 and 66 through the openings 67 into the one large chamber 61 between the casing 4 and the tube 2 where they are expanded and cooled. A portion of this gas travels to the left in the chamber 61 and returns into the tube 2 through the openings 64 where it conflicts with and meets the gases passing through the tube 2. Hence, in this case some of the gases travel a complete loop before passing beyond the casing 4 and out of the exhaust end of the conduit 2.

In the form shown in Fig. 18 the conduit 2 has struck therein a plurality of aligned and concentric tongues 56 which form the openings 57. To the rear of these struck-in tongues the tube is provided with a plurality of holes 58. In this instance some of the gas is deflected by the tongues 56 outwardly through the openings 57 into the chamber 59 where the gas expands and is cooled. Then some of this gas passes through the openings 58 into the tube 2 where it serves to cushion that portion of the gases which passes directly through the tube 2 and past the tongues 56. This same action is repeated as the gases enter the portion of the tube 2 beyond the baffle 60.

It is, of course, understood that in the muffling of the explosion sounds it is necessary to break up or destroy the sound waves with a minimum of back pressure. This destruction of the sound waves can be achieved in numerous ways such as permitting the gases to expand and to cool the same. This is the case when the gases pass from the tube 2 into the chambers surrounding the same. Another way is to cushion a portion of the gases by another portion of the same. This occurs when the gases flow from the chambers surrounding the tube 2 and conflict with the gasses passing through the tube 2. Then again the inwardly struck tongues form impediments in the path of the exhaust gases which break up and dissipate a portion of the sound waves. It is also appreciated that the various means of obstructing and expanding the exhaust gases causes various currents and eddies of different wave lengths which conflict with the sound waves and tend to destroy the same. These various ways of muffling and destroying the explosion noises have been achieved by the various means herein disclosed in a manner that will achieve the most efficient muffling of the sound and yet not create an objectionable back pressure.

In the form shown in Fig. 19 the chamber between the casing 4 and the conduit 2 is divided into a plurality of separate sections by the baffles 100. The portion of the exhaust conduit within each section is provided with a plurality of perforations 101 and the struck-in tongues 102. A cup-shaped baffle 103 is welded or otherwise suitably fixed completely around the exhaust pipe as at 104. This cup baffle 103 has its sides flared outwardly from its area of contact 104 with the conduit 2 so that its outer rim 105 is spaced between the exhaust conduit 2 and the casing 4. The exhaust gases in this form enter from the right as indicated by the arrows. Some of the exhaust gases pass directly through the conduit 2 while others are deflected outwardly by the struck-in tongues 102, but upon passing through the openings formed by the struck-in tongues 102 they meet with the baffle 103 and are deflected backwardly past the outer rim 105 of the baffle whereupon they enter the chamber between the casing 4 and the conduit 2. Some of the gases that enter the chamber between the casing 4 and the conduit 2 re-enter the conduit through the openings 101 whereas another portion of the gas will re-enter the conduit 2 through the openings formed by the struck-in tongues 102, these latter gases serving to cushion that portion of the exhaust gas which is deflected outwardly by the tongues 102.

The form shown in Fig. 20 is similar to that shown in Fig. 19. This form has two circumferential rows of struck-in tongues 106 and 107. The cup-shaped baffle 108 is similar to the baffle 103 in the form shown in Fig. 19, the only difference being that it is extended over the openings formed by the struck-in tongues 106 as well as those formed by the struck-in tongues 107. This formation of struck-in tongues and cup-shaped baffle will likewise cause a conflict and cushioning effect of one gas against another to effectively break up the sound waves.

In some instances conditions prevent the use of an integral exhaust, muffler, and tail pipe. In such a case the exhaust pipe and muffler might be used as an individual unit with a separate tail piece, or the tail pipe and muffler might be used as an individual unit with a separate exhaust pipe.

From the foregoing description it is evident that there is here produced an exhaust conduit and muffler combination wherein the exhaust conduit extending from the exhaust manifold to the atmosphere is a single integral tube and which has a portion thereof surrounded by a hollow casing which has a gas-tight seal at each end with the tube and forms a chamber surrounding the side tube, the portion of the tube within the said casing being variously formed by struck-in tongues or holes or a combination of tongues and holes to form a muffler. It is also evident that this combination is easily assembled to the automotive vehicle and recommends itself as being exceedingly simple and cheap to produce.

We claim:

1. A muffler comprising in combination a tube, a casing surrounding the said tube in gas-tight relation and forming a chamber therewith, the said tube having a plurality of struck-in tongues forming a plurality of openings permitting communication between the inside of the tube and the said chamber, and a cup-shaped baffle secured to the said tube and projecting over the said openings so that the free edge of the said cup-shaped baffle is positioned between the tube and the casing.

2. A muffler comprising in combination a tube, a casing surrounding the said tube in gas-tight relation and forming a chamber therewith, the said tube having a plurality of struck-in tongues and a plurality of perforations spaced from the said tongues, a cup-shaped baffle secured to the tube between the struck-in tongues and perforations and projecting outwardly over the openings formed by the struck-in tongues.

3. A muffler comprising in combination a tube, a casing surrounding the said tube in gas-tight relation and forming a chamber therewith, a baffle circumferentially positioned about the said tube in the said chamber and dividing the said chamber into a plurality of sections, the tube having a plurality of struck-in tongues and a plurality of perforations spaced from the struck-in tongues, a cup-shaped baffle for each chamber section secured to the tube between the struck-in tongues and perforations and projecting outwardly over the openings formed by the struck-in tongues.

RICHARD O. BERG.
SIMON BERG